US 6,647,624 B2

(12) United States Patent
Fried et al.

(10) Patent No.: US 6,647,624 B2
(45) Date of Patent: Nov. 18, 2003

(54) METHOD OF FITTING AN IMPINGEMENT PLATE

(75) Inventors: Reinhard Fried, Nussbaumen (CH); Richard London, Birmenstorf (CH); Peter Marx, Baden (CH)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 10/187,004

(22) Filed: Jul. 2, 2002

(65) Prior Publication Data

US 2003/0031562 A1 Feb. 13, 2003

(30) Foreign Application Priority Data

Jul. 5, 2001 (CH) .................................... 2001 1243/01

(51) Int. Cl.⁷ ................................................ B23P 15/00
(52) U.S. Cl. ....................... 29/889.2; 29/464; 29/407.09
(58) Field of Search ............................. 29/889.2, 889, 29/464, 466, 407.09, 407.1, 407.01; 415/114, 115, 96 A; 228/175, 176, 178, 182

(56) References Cited

U.S. PATENT DOCUMENTS

| 3,770,933 A | | 11/1973 | Holko et al. |
| 3,982,850 A | | 9/1976 | Jenkinson |
| 4,040,767 A | | 8/1977 | Dierberger et al. |
| 6,120,249 A | | 9/2000 | Hultgren et al. |
| 6,468,669 B1 | * | 10/2002 | Hasz et al. .................. 428/553 |
| 2002/0028135 A1 | * | 3/2002 | Burdgick ..................... 415/116 |
| 2002/0114696 A1 | * | 8/2002 | Miller et al. ................. 415/115 |
| 2002/0168537 A1 | * | 11/2002 | Hasz et al. .................. 428/553 |
| 2003/0026689 A1 | * | 2/2003 | Burdgick et al. ............. 415/115 |

FOREIGN PATENT DOCUMENTS

| DE | 2042947 | | 6/1971 |
| DE | 4307198 | A1 | 9/1994 |
| EP | 0534207 | A1 | 3/1993 |
| WO | 99/36675 | | 7/1999 |

* cited by examiner

Primary Examiner—I Cuda-Rosenbaum
(74) Attorney, Agent, or Firm—Burns, Doane, Swecker & Mathis, L.L.P.

(57) ABSTRACT

A method of fitting an impingement plate to a platform of a guide blade of a gas turbine. The impingement plate is first fastened at individual spots by spot welds to at least one supporting surface of the platform and is then brazed at the supporting surface to the platform. The impingement plate is prefabricated with recesses and the spot welds are executed at the recesses.

5 Claims, 2 Drawing Sheets

METHOD OF FITTING AN IMPINGEMENT PLATE

CROSS REFERENCE TO RELATED APPLICATIONS

This application claims priority under 35 U.S.C. §§119 and/or 365 to Appln. No. 2001 1243/01 filed in Switzerland on Jul. 5, 2001; the entire content of which is hereby incorporated by reference.

FIELD OF THE INVENTION

The invention relates to a method of fitting an impingement plate to a guide blade.

BACKGROUND OF THE INVENTION

Numerous turbine blades with cooling arrangements are known from the prior art. Laid-open Specification DE 2 042 947 discloses, for example, an air-cooled blade which, in addition to an internal cooling system in a cavity, is cooled on one side by impingement cooling. Specifications U.S. Pat. No. 4,040,767, EP-A1-534207, WO99/36675 or U.S. Pat. No. 6,120,249 also show such cooling systems of turbine blades. It is generally known therefrom to cool the platform by impingement cooling. An impingement or insert plate or a cooling plate is brazed or welded onto a step of the platform and, by means of cooling holes, serves for the impingement cooling of the platform located at a certain distance below it.

The impingement plates must be tightly connected at their periphery to the platform of the blade. In one embodiment, this sealing or fastening can be produced by high-temperature brazing to a geometrically defined supporting surface on the blade. This supporting surface may be, for example, the rim of the platform or of a cavity or also existing ribs. Since these supporting surfaces or the impingement plates are often not true-to-size due to the production process, the height of the brazing gap or the quality of the brazing preparation depends on the particular person who manually carries out the tacking of the impingement plates. The impingement plates are adapted to the supporting surfaces and secured by additional weld spots. These weld spots are intended to minimize the brazing gap and prevent uncontrolled bulging during the brazing. The spot welds in particular, however, can vary in their spacing and in their contact pressure. This may lead to pronounced fluctuations in the height of the brazing gap. Since the setting of the brazing gap is a decisive process variable for the quality of the brazing, the methods used hitherto are susceptible to brazing faults.

In other cases, it has been attempted to set the brazing gap by shims or brazing foil which are placed between the impingement plate and the supporting surface. However, this process is very time-consuming and likewise requires manual work.

SUMMARY OF THE INVENTION

The object of the invention is to provide a method with which the height of the brazing gap between the impingement plate and the supporting surfaces on the platform of a guide blade can be standardized or set.

According to the invention, the object is achieved by a method of fitting an impingement plate to a platform of a guide blade of a gas turbine, the impingement plate being fastened to at least one supporting surface by means of spot welds and then being brazed onto the supporting surface to the platform by means of high temperature brazing at a brazing gap, the impingement plate having cooling holes, wherein the impingement plate is prefabricated with recesses and the spot welds are executed at the recesses.

The method according to the invention advantageously avoids a situation in which the height of the brazing gap is determined by the contact pressure during the spot welding. The depth of the recesses predetermines the height of the brazing gap.

The recesses of the impingement plate can be formed by stamping, for example at the same time as the cooling holes are made, so that no additional work is involved. The recesses should be kept as small as possible in order to avoid unnecessary losses in the brazing area. They may have, for example, a diameter of 1 to 3 mm. The height of the brazing gap may lie, for example, within a range of 0.05 to 0.1 mm.

BRIEF DESCRIPTION OF THE DRAWINGS

The invention is described with reference to the attached drawings, in which.

Only the elements essential for the invention are shown. The same elements are provided with the same reference numerals in different drawings.

DETAILED DESCRIPTION OF THE INVENTION

Figure 1:
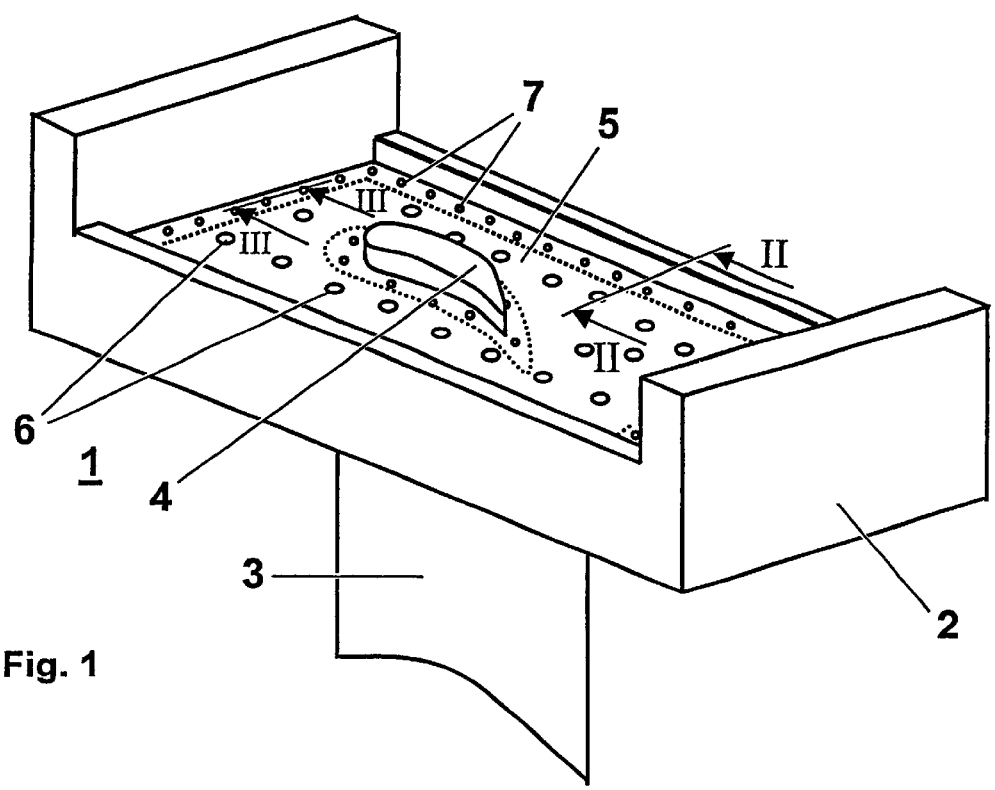
FIG. 1 shows a turbine blade with an impingement plate.

FIG. 1 shows a guide blade 1 of a gas turbine with a platform 2, a blade body 3 and a cavity 4. As a rule, such a guide blade 1 is made of a nickel-base superalloy. Cooling air is directed into the cavity 4 of the guide blade 1 during operation of the turbomachine. The cavity 4 is provided with an internal cooling system in a manner known per se. In addition, the platform 2 of the guide blade 1 shown is cooled by impingement cooling. For this purpose, an impingement plate 5 which contains cooling holes 6 is brazed with a brazing gap 9 onto a supporting surface 10 of the platform 2 by means of high-temperature brazing. During operation of the guide blade 1, cooling air flows onto the impingement plate 5, this air flowing through the cooling holes 6 and in this way cooling the platform 2 underneath, which is located at a certain distance. As a rule, the impingement plate 5 is likewise made of a nickel-base superalloy.

Before the high-temperature brazing, the impingement plate 5 is additionally welded at the margin onto the supporting surface 10 on the platform 3 by spot welds 7 in order to minimize the brazing gap 9 and avoid uncontrolled bulging during the subsequent brazing. These spot welds 7 may additionally be executed on supporting surfaces 10 around the cavity 4 and also on other supporting surfaces 10 (not shown in FIG. 1) on the platform 2. Such supporting surfaces 10 may be, for example, existing ribs or the like. This welding may be executed by a welding process known from the prior art.

Figure 2:
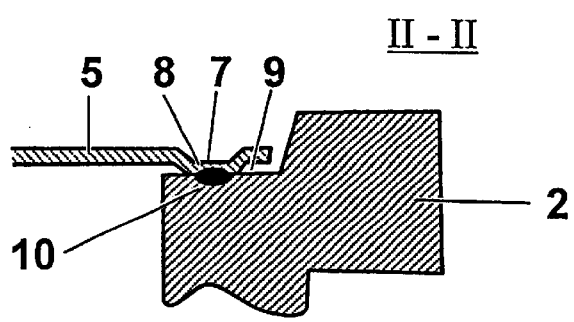
FIG. 2 shows a section through a turbine blade and impingement plate of FIG. 1 along line II—II.
Figure 3:
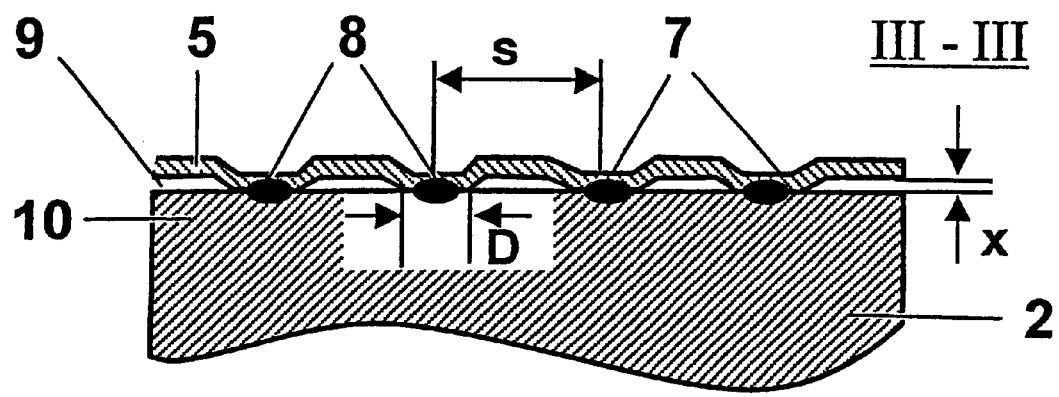
FIG. 3 shows a section through a turbine plate and impingement plate of FIG. 1 along line III—III.

As can be seen from FIGS. 2 and 3, the impingement plate 5, according to the invention, is prefabricated with recesses 8. The spot welds 7 are executed at these recesses 8. The height x of the brazing gap 9 can be set by the prefabrication of the impingement plates 5 with the recesses 8. This height x will lie, for example, within a range of 0.05 to 0.1 mm. The shape and position of the recesses 8 may be provided in accordance with the requirements of the individual case. The recesses 8 should advantageously be kept as small as possible in order to avoid unnecessary losses in the brazing area. As an example, the diameter D of the recesses 8 may therefore lie within a range of 1 to 3 mm and be provided at a spacing s of 5 to 15 mm. The recesses advantageously avoid a situation in which the height of the brazing gap 9 is determined by the contact pressure during the spot welding 7.

The recesses of the impingement plate may advantageously be formed by stamping at the same time as the cooling holes are made, so that no additional work is involved.

List of Designations

1 Guide blade
2 Platform
3 Blade body
4 Cavity
5 Impingement plate
6 Cooling hole
7 Spot weld
8 Recess
9 Brazing gap
10 Supporting surface
s Distance between recesses 8
x Height of the brazing gap 9
d Diameter of the recesses 8

What is claimed is:

1. A method of fitting an impingement plate to a platform of a guide blade of a gas turbine, the impingement plate being fastened to at least one supporting surface by means of spot welds and then being brazed onto the supporting surface to the platform by means of high-temperature brazing at a brazing gap, and the impingement plate having cooling holes, wherein the impingement plate is prefabricated with recesses and the spot welds are executed at the recesses.

2. The method as claimed in claim 1, wherein the recesses of the impingement plate are produced by stamping.

3. The method as claimed in claim 2, wherein the recesses of the impingement plate are produced by stamping at the same time as the cooling holes.

4. The method as claimed in claim 1, wherein the impingement plate is produced with recesses which have a diameter of 1 to 3 mm.

5. The method as claimed in claim 1, wherein the height of the brazing gap is set to 0.05 to 1 mm.

* * * * *